Patented Jan. 21, 1930

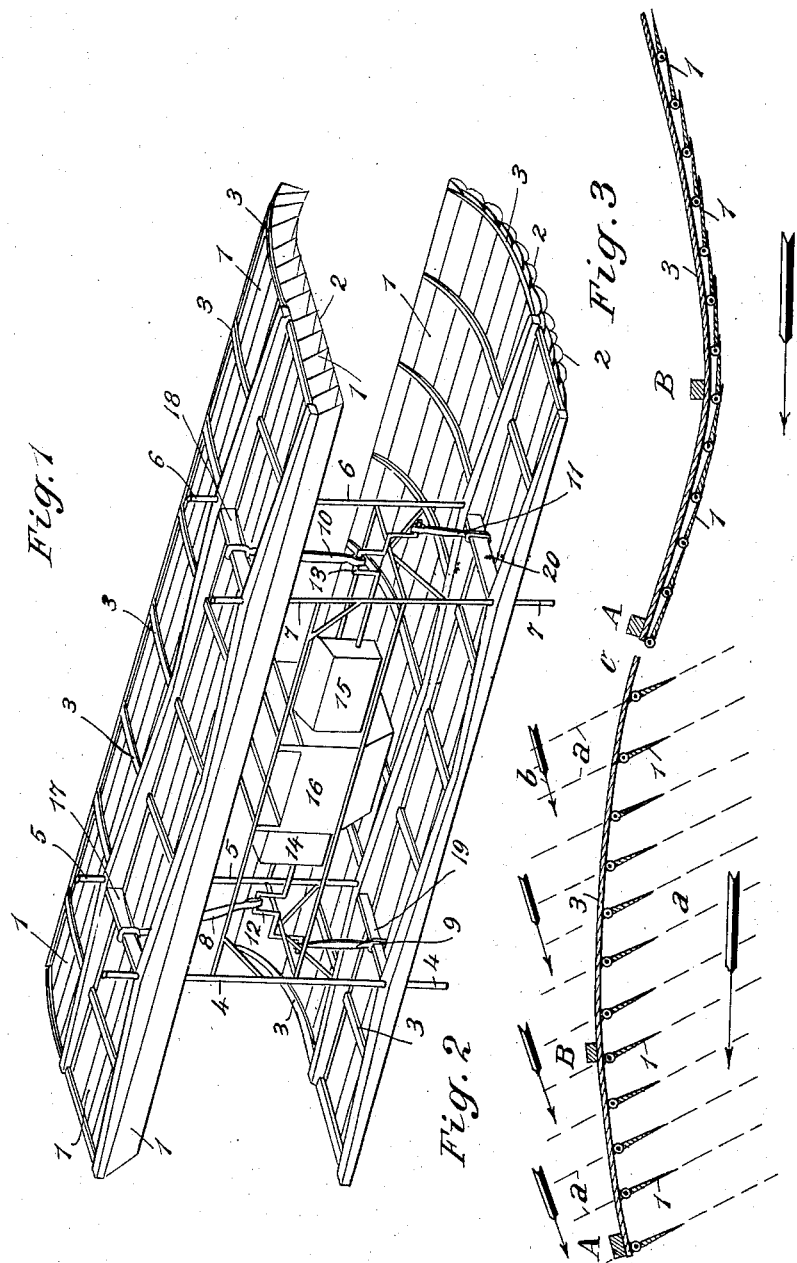

1,744,080

UNITED STATES PATENT OFFICE

ANDREA PROSDOCIMI, OF ESTE, ITALY

SUPPORTING PLANE FOR AIRCRAFT COMPRISING MOVABLE ELEMENTS CONTROLLED BY MOTORS

Application filed July 10, 1928, Serial No. 291,578, and in Italy July 16, 1927.

The present invention relates to supporting planes for aircraft comprising a plurality of longitudinal, parallel, movable elements to which a reciprocating movement is transmitted by a motor, so that they may be opened to allow a free passage of the air, thus every resistance being removed, and closed to offer the greatest resistance, in the latter case the elements overlapping each other by their free ends.

Said planes comprises a rigid fore surface, restrained during the normal flight to the central longéron, and a flexible rear surface, this flexible surface contributing, when the planes bear on the air and the elements are closed, to supply a propelling thrust to the flying machine. The rigid surface is controlled by connecting rods in combination with a motor, so that the planes, while vertically gliding on the connecting uprights, synchronically approach to or are taken away from one another.

The invention is illustrated only by way of example in the accompanying drawings, in which:

Fig. 1 shows a perspective schematic view of an aircraft provided wth supporting planes according to application;

Fig. 2 shows a cross section of a supporting plane with open elements and the flexible surface out of action;

Fig. 3 shows a view like that of Fig. 1 with closed elements, while the plane is bearing on the air, consequently the flexible surface acting as a propelling means.

As illustrated in the figures the planes consist of a plurality of longitudinal, parallel, rotatable elements 1 overlapping each other by their free ends when they are closed, conveniently connected to each other by ties 2 regulating their opening. Said elements are fixed to the ribs 3 on the ventral profile. The planes are connected to each other by uprights 4—5—6—7 on which they are free to slide vertically owing to the action of the connecting rods or thrust arms 8—9—10—11 in their turn connected with cranks 12—13 operated by motors 14 and 15.

The connecting rods are united with the ribs 17—18—19—20 and the result of their action is to approach to or to take away from each other the supporting planes on the uprights, so that the elements 1 are caused to open or to be closed. While they are open they are out of action, when closed they operate and obtain alternately a propelling thrust while the planes are bearing on the air. The car 16 is arranged on the lower plane.

Functioning

The planes according to application allow the execution of the horizontal flight by displacing the center of gravity backwards and inclining the planes, so that owing to the action of the two fore and rear surfaces, one A—B rigid, the other B—C flexible, a middle vertical rise component is obtained and during the action of this component the two surfaces are inclined towards the central line of the plane, while the inclination of the elements adequately diminishes. It is to be remarked that a second displacing action is given by the elements 1, controlled by the connecting ties 2, said elements forming as many fractions of inclined planes —a— so that owing to the resistances indicated by the arrows —b— the planes are obliged to slide and be displaced horizontally. The diminution consequently of the inclination of the elements 1 during the vertical functioning contributes to increase the vertical action.

When the height wanted is attained the horizontal flight is obtained by displacing forward the center of gravity, the inclination of the planes being regulated in such a way that the resultant of the action of the two surfaces, rigid and flexible, is the smallest possible, necessary for the supporting of aircraft but the greatest as a propelling force. During this flight the rigid surface A—B (Fig. 3) will assume an inclination according to the greatest inclination of the flexible surface B—C, so that the propelling thrust will be the greater. Consequently the inclination of the elements 1 will also be greater, and the greater will be the contribution to the horizontal displacement the elements have given during the ascending movement of the plane.

By displacing the center of gravity and equilibrating the two ways of action mentioned a suspension in the air of the aircraft may be obtained.

Having now particularly described and ascertained the nature of my said invention and in what manner the same is to be performed I declare that what I claim is:

1. In aircraft construction, supporting superimposed planes, each thereof comprising a plurality of longitudinally disposed elements mounted to swing in parallel planes for open to closed positions, means connected to the free ends of the elements to control their uniform movement, each plane being rigid at its leading end and flexible at the trailing end, whereby the shifting of the center of gravity of the craft will effect the inclination of the elements.

2. Aircraft construction as claimed in claim 1, including means for reciprocating said planes towards and away from each other to open and close the elements.

In testimony whereof I have hereunto signed my name.

ANDREA PROSDOCIMI.